(12) United States Patent
Cai

(10) Patent No.: US 11,353,584 B2
(45) Date of Patent: Jun. 7, 2022

(54) LASER RANGEFINDER AND METHOD FOR IMPLEMENTING THE SAME

(71) Applicant: Fangyi Cai, Nanchang (CN)

(72) Inventor: Fangyi Cai, Nanchang (CN)

(*) Notice: Subject to any disclaimer, the term of this patent is extended or adjusted under 35 U.S.C. 154(b) by 0 days.

(21) Appl. No.: 16/820,679

(22) Filed: Mar. 16, 2020

(65) Prior Publication Data
US 2020/0217958 A1    Jul. 9, 2020

Related U.S. Application Data

(63) Continuation-in-part of application No. 15/791,382, filed on Oct. 23, 2017, now abandoned.

(51) Int. Cl.
| | | |
|---|---|---|
| G01S 17/08 | (2006.01) | |
| G01S 7/484 | (2006.01) | |
| G01S 7/4861 | (2020.01) | |
| G01S 7/4911 | (2020.01) | |

(52) U.S. Cl.
CPC .............. *G01S 17/08* (2013.01); *G01S 7/484* (2013.01); *G01S 7/4861* (2013.01); *G01S 7/4911* (2013.01)

(58) Field of Classification Search
CPC ........ G01S 17/08; G01S 7/4911; G01S 7/484; G01S 7/4861; G01S 17/18; G01S 7/4865
USPC ........................................................ 356/5.03
See application file for complete search history.

(56) References Cited

U.S. PATENT DOCUMENTS 7,499,150 B2 * 3/2009 Lewis .................. G01S 7/4811
356/5.01

* cited by examiner

*Primary Examiner* — Daniel L Murphy
(74) *Attorney, Agent, or Firm* — Leong C. Lei

(57) ABSTRACT

A laser rangefinder and a method for implementing the same are provided. When the distance is measured, a number of laser signals are emitted from an emitting unit to an object to be measured. A receiving unit receives the laser signals reflected by the measured object and converts them into an electrical pulse signal. A time measuring unit converts a trigger signal of a laser emitter and the electric pulse signal converted by the laser receiver into a rectangular gate signal. The width of the rectangular gate signal is measured by a pulse counter unit with high precision.

2 Claims, 3 Drawing Sheets

LASER RANGEFINDER AND METHOD FOR IMPLEMENTING THE SAME

CROSS REFERENCE TO RELATED APPLICATIONS

This is a continuation-in-part application of co-pending U.S. patent application Ser. No. 15/791,382, "LASER RANGEFINDER AND METHOD FOR IMPLEMENTING THE SAME", filed on Oct. 23, 2017.

BACKGROUND OF THE INVENTION

(1) Field of the Invention

The present invention relates to a laser rangefinder, and more particularly to a laser rangefinder and a method for implementing the same.

(2) Description of the Prior Art

A laser rangefinder is an instrument that uses the laser to accurately measure the distance of the object. The laser rangefinder emits a very fine laser beam to the object during operation and receives the laser beam reflected by the object through a photoelectric element. A time measuring device measures the time of the laser beam from emitting to receiving for calculating the distance from the observer to the object.

There are various laser rangefinders on the markets, and there are various methods for implementing the ranging.

As disclosed in Chinese Patent application number 201210291997.1, the measurement principle uses the time expansion method which is used in most of the distance measurements. The laser transmission time is linearly amplified N times, and then a pulse generated by a lower frequency crystal oscillator is counted after the expansion time for calculating the distance from the measured point to the object.

As disclosed in Chinese Patent application number 201610494652.4, a direct counting method is used to implement a rough distance measurement, and a mixing frequency technology is used to implement a precise distance measurement.

Chinese Patent application number 201610890733.6 discloses a laser ranging method based on mode-locked pulse series. The transmission times of a measuring beam and a reference beam are measured, respectively. A rough distance measurement value is obtained by calculating the pulse difference. A precise value is obtained by measuring the phase difference of the two beams to obtain the distance from the ranging point to the object.

Although the above products can achieve the purpose of ranging, the measuring speed is slow, the response time is long, and the precision of measurement is low.

SUMMARY OF THE INVENTION

In view of the shortcomings of the prior art, the primary object of the present invention is to provide a laser rangefinder and a method for implementing the same, which provides not only a fast measurement but also a high accuracy, thereby overcoming the deficiencies of the prior art.

In order to achieve the above object, the present invention adopts the following technical solution.

A laser rangefinder and a method for implementing the laser rangefinder, the laser rangefinder comprising:

an emitting unit, the emitting unit including an emitting driving module and a laser emitter connected to the emitting driving module;

a receiving unit, the receiving unit including a laser receiver and a signal amplifying module, the laser receiver being in electrical connection with the signal amplifying module;

a time measuring unit, the time measuring unit including a phase-locked loop module, a communication module connected to the phase-locked loop module, a counter unit and a gate signal module; an output end of the signal amplifying module being connected to the gate signal module, the gate signal module having one output end connected to the emitting driving module and another output end connected to the counter unit, an output end of the counter unit being connected to the communication module; the counter unit being composed of eight independent pulse counters; the phase-locked loop module having frequency multiplication (frequency multiplication factor being 6) and a phase shift function module to synchronously generating multiple clock signals with a same frequency and phase difference of 45° to the respective counters;

a data processing and control unit, the data processing and control unit including a microprocessor, the microprocessor being connected to an output end of the communication module;

an acceleration sensor, connected to the microprocessor;

a display module, connected to the microprocessor;

a power supply control module, a control end of the power supply control module being connected to the microprocessor, the power supply control module having three output ends connected to the emitting unit, the receiving unit, and the time measuring unit respectively; and a button, connected to the microprocessor, an output end of the microprocessor being connected to the time measuring unit;

the method for implementing the laser rangefinder, comprising the following steps of:

a. an aiming device of the laser rangefinder being used to aim at an object to be measured, the button being pressed to start measuring;

b. the microprocessor responding to the key in real time, the power supply control module energizing the emitting unit, the receiving unit and the time measuring unit;

c. the microprocessor sending a trigger signal periodically to the time measuring unit;

d. the time measuring unit receiving the trigger signal and simultaneously sending a synchronous trigger signal through the gate signal module, the synchronous trigger signal controlling the laser emitter to emit a laser beam, the synchronous trigger signal simultaneously triggering the counter unit to start counting;

e. the laser receiver receiving the laser beam reflected by the measured object, the laser beam through the signal amplifying module generating an end pulse to the gate signal module of the time measuring unit, the gate signal module sending the end pulse to the counter unit for terminating the count immediately;

in the process, a start signal provided by the microprocessor being converted into a falling edge of the gate signal after synchronization, a reflected signal received by the receiving unit being converted into a rising edge of the gate signal to form a negative rectangular gate signal, a signal generated by an external high frequency crystal oscillator being performed for six times frequency multiplication and phase shift by the phase-locked loop module to generate eight high frequency signals as the clock signals of the counter unit, a time width of upper and lower edges of the rectangular gate signal being measured by the eight independent pulse counters respectively, that is, the time for the laser signal to pass a distance from the laser rangefinder to the measured object;

f. an integrated count result N of the counter unit composed of the eight independent pulse counters being transmitted to the microprocessor through the communication module;

g. the microprocessor receiving the integrated count result N of the counter unit, calculating a time value by the microprocessor, reading 3D number axis information of the acceleration sensor, and ending a measurement;

the time being calculated by the microprocessor: time t=N*T0/16, where N is the integrated count result, and T0 is the time period after the external crystal oscillator of 50 MHz is performed for six times frequency multiplication by the phase-locked loop module;

a distance between a ranging point and the measured object D=C*t=C*N*T0/16, T0=1/3*10$^{-8}$ s, C (the speed of light)=3*10$^8$ m/s, that is, D=N/16(m), h. the steps c-g being repeated several times until samples obtained reaches statistical samples of 120;

i. iterative algorithm being used to integrate a number of measurement results and calculate the distance between the ranging point and the measured object;

after the microprocessor sends the trigger signal, acceleration three-dimensional component data, Ax, Ay, and Az, being read from the acceleration sensor, the microprocessor calculating an inclination angle $\theta=\tan^{-1}\sqrt{Ay^2+Az^2}/Ax$ between a line connecting the ranging point and the measured object and a horizontal line;

j. the results being displayed through the display module.

Preferably, in step c, the trigger signal is sent periodically with a period of 0.5 ms-10 ms.

Preferably, in step e, the crystal oscillator has a frequency of 50 MHz, and the phase-locked loop module has a frequency multiplication factor of 6.

Preferably, in step j, there are four display modes;

mode 1, only displaying the distance between the ranging point and the measured object (unit: meter);

mode 2, only displaying the distance between the ranging point and the measured object (unit: yard);

mode 3, displaying the distance between the ranging point and the measured object (unit: meter) and the inclination angle between the line connecting the ranging point and the measured object and the horizontal line (unit: degree);

mode 4, displaying the distance between the ranging point and the measured object (unit: yard) and the inclination angle between the line connecting the ranging point and the measured object and the horizontal line (unit: degree).

Preferably, the display module is a liquid crystal display.

Preferably, in step i, the iterative algorithm: in data of 120 samples, the frequency of occurrence is counted in order according to the size of sample data, and the sample data with the most occurrence frequency is taken as a valid sample.

The present invention has obvious advantages and beneficial effects compared with the prior art. In particular, it is known from the above technical solution that the phase-locked loop module has frequency multiplication and phase shift function module to generate eight clock signals with the same frequency and phase difference of 45° to the respective counters. In the measurement method, the eight-channel phase-shift direct counting method is used. That is, the signal generated by the high frequency crystal oscillator is performed for six times frequency multiplication and phase shift by the phase-locked loop module to generate eight high frequency signals as the clock signals of the counter unit (composed of eight counters). The gate signal module converts the transmission time from the laser ranging point to the measured object into a rectangular gate signal, and the eight counters directly count the widths of the upper and lower edges of the rectangular gate signal to obtain an integrated count result N. The measurement time tis calculated by the formula in the microprocessor. The distance D between the ranging point and the measured object is calculated from the measurement time t. When this measurement method is used to measure the distance, only the upper and lower edges of the rectangular gate signal are counted and added with the subsequent processing to take the average, so that the final measurement result can be obtained fast and precisely. In addition, because the acceleration sensor can measure the three-dimensional component of acceleration, the angle between the emitted beam and the horizontal plane can be calculated. The iterative algorithm is used to integrate several measurement results to calculate the distance and the inclination angle $\Phi$ between the ranging point and the measured object, so that the laser rangefinder of the present invention displays not only the measured distance but also the inclination angle. The function is more comprehensive.

DETAILED DESCRIPTION OF THE PREFERRED EMBODIMENTS

Embodiments of the present invention will now be described, by way of example only, with reference to the accompanying drawings.

Figure 1:
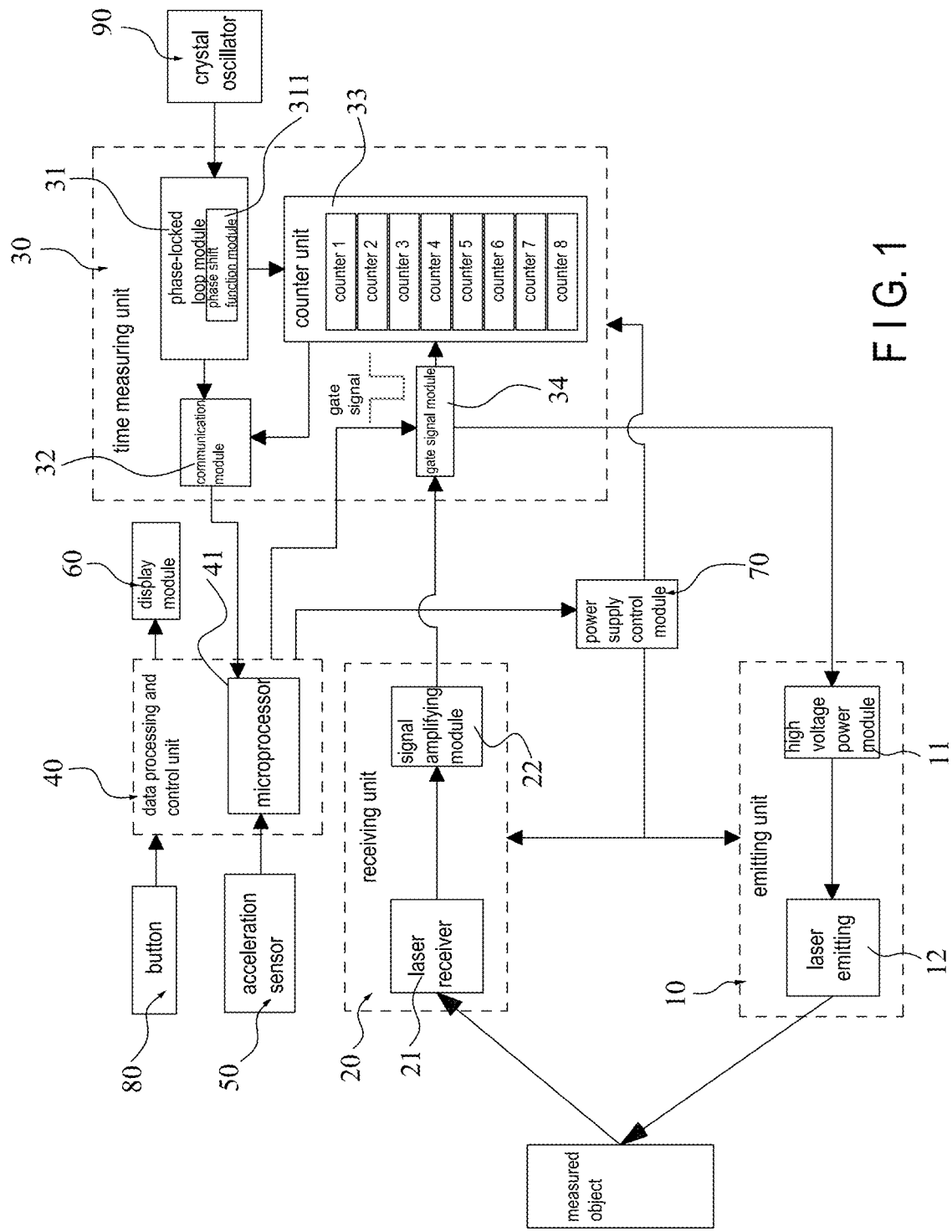
FIG. 1 is a block diagram according to an embodiment of the present invention.
Figure 2:
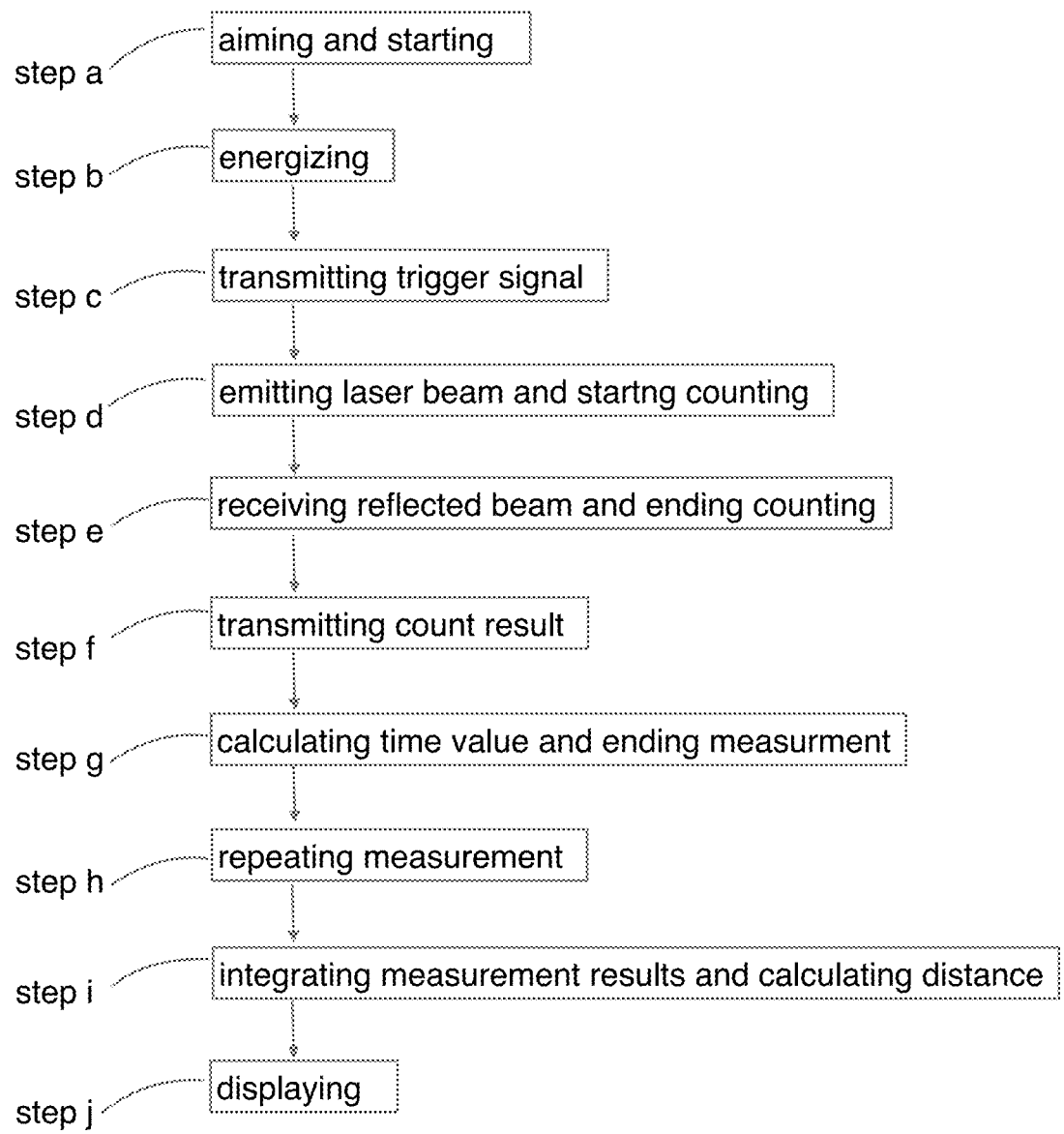
FIG. 2 is a flow chart illustrating a method for implementing a laser rangefinder according to the present invention.
Figure 3:
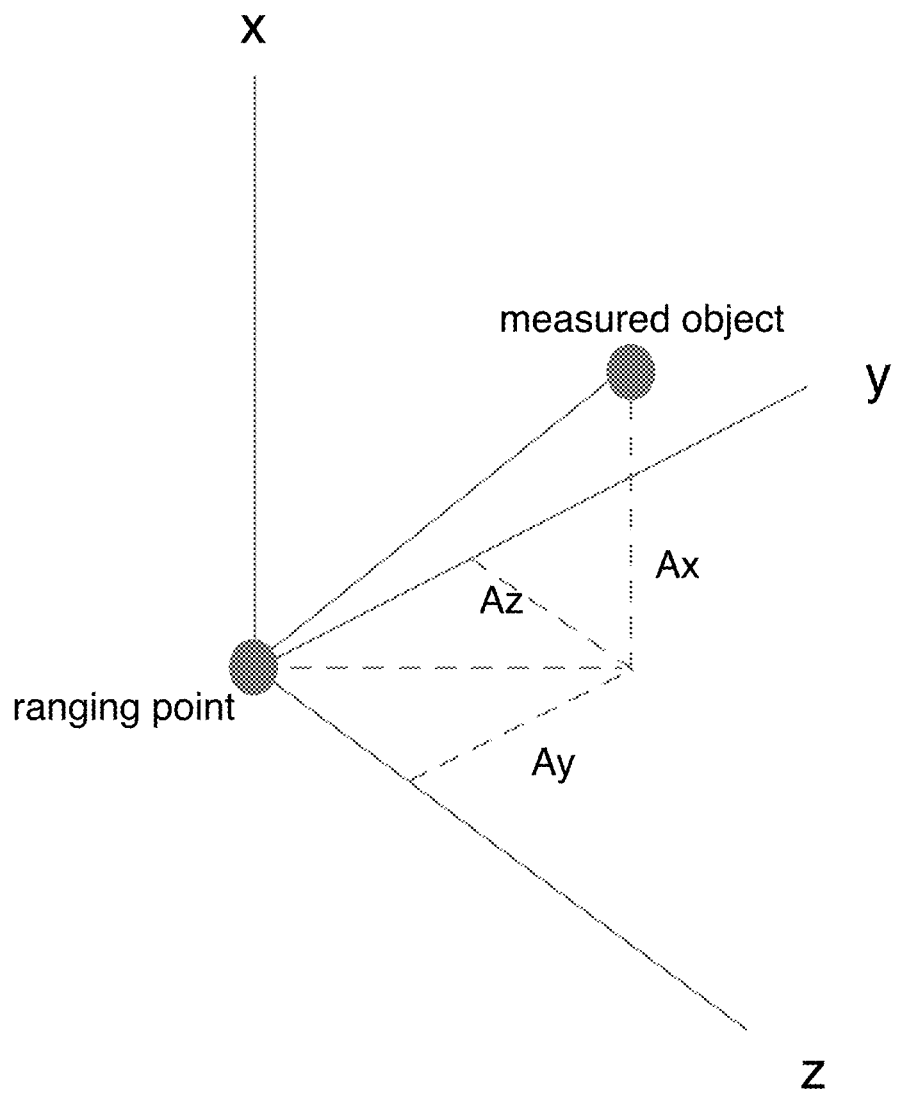
FIG. 3 is a schematic view illustrating a spatial relationship between a ranging point and a measured object in a coordinate system defined by an x-axis, a y-axis, and a z-axis.

As shown in FIG. 1, a laser rangefinder in accordance with a preferred embodiment of the present invention comprises an emitting unit 10, a receiving unit 20, a time measuring unit 30, a data processing and control unit 40, an acceleration sensor 50, a display module 60, a power supply control module 70, and a button 80.

The emitting unit 10 includes an emitting driving module 11 and a laser emitter 12 connected to the emitting driving module 11. The laser emitter 12 has a laser emitting head, a lens, and the like. The emitting driving module 11 supplies a high voltage to the laser emitting head to emit a laser beam.

The receiving unit 20 includes a laser receiver 21 and a signal amplifying module 22. The laser receiver 21 is in electrical connection with the signal amplifying module 22. The laser receiver 21 is used for receiving a laser signal reflected from an object to be measured and for converting the laser signal into an electrical pulse signal. The signal amplifying module 22 amplifies the waveforms of the electrical pulse, and then corrects or transforms the distorted waveforms or different waveforms in the electrical pulse signal.

The time measuring unit 30 includes a phase-locked loop module 31, a communication module 32 connected to the phase-locked loop module 31, a counter unit 33, and a gate signal module 34. An output end of the signal amplifying module 22 is connected to the gate signal module 34. The gate signal module 34 has one output end connected to the emitting driving module 11 and another output end connected to the counter unit 33. An output end of the counter unit 33 is connected to the communication module 32. The gate signal module 34 converts the control signal of the laser emitter 12 and the electrical pulse signal converted by the laser receiver 21 into a rectangular gate signal. The communication module 32 is used to connect a microprocessor and its peripheral devices to communicate with each other. The counter unit 33 is composed of eight independent pulse counters. The phase-locked loop module 31 has frequency multiplication (frequency multiplication factor being 6) and a phase shift function module 311, which can generate eight clock signals with the same frequency and phase difference of 45° to the respective counters. When in operation, the high precision pulse counter measures the width of the rectangular gate signal.

The data processing and control unit 40 includes a microprocessor 41. The microprocessor 41 is written with software to complete a series of functions, such as power control, signal triggering, calculation, comparison, and logic processing. The microprocessor 41 is connected to an output end of the communication module 32 for receiving the count result of the counter and for directly calculating the received result.

The acceleration sensor 50 is connected to the microprocessor 41. The acceleration sensor 50 measures the inclination angle between the emitted laser beam and the horizontal plane.

The display module 60 is connected to the microprocessor 41 for displaying the measured distance value, angle, and the like.

The button 80 is connected to the microprocessor 41. One end of the power supply control module 70 is connected to the microprocessor 41. The power supply control module 70 has three output ends connected to the emitting unit 10, the receiving unit 20, and the time measuring unit 30 respectively. An output end of the microprocessor 41 is connected to the time measuring unit 30. When the button 80 is pressed, the microprocessor 41 is triggered to activate the power supply control module 70 to energize the emitting unit 10, the receiving unit 20 and the time measuring unit 30 and to simultaneously send a trigger signal to the time measuring unit 30 for counting at any time.

The working principle of the laser rangefinder of the present invention is as follows: When the distance is measured, the emitting unit 10 emits a laser beam in the form of a plurality of laser pulses to an object to be measured. The receiving unit 20 receives the laser signals reflected by the measured object and converts them into an electric pulse signal. The time measuring unit 30 converts the control signal of the laser emitter 12 and the electric pulse signal converted by the laser receiver 21 into a rectangular gate signal. The width of the rectangular gate signal is measured by the high precision pulse counter unit 33. The acceleration sensor 50 measures the angle of inclination of the rangefinder and calculates the angle between the emitted laser beam and the horizontal plane by calculation. The data processing and control unit 40 converts the measured time into a distance and displays the straight line distance and the angle of inclination between the ranging point and the object through the display module 60.

The method for implementing the laser rangefinder comprises the following steps:

a. The aiming device of the laser rangefinder is used to aim at an object to be measured, and the button 80 is pressed to start the measurement.

b. The microprocessor 41 responds to the key 80 in real time, the power supply control module 70 energizes the emitting unit 10, the receiving unit 20, the time measuring unit 30.

c. The microprocessor 41 sends a trigger signal periodically to the time measuring unit 30.

d. The time measuring unit 30 receives the trigger signal and simultaneously sends a synchronous trigger signal through the gate signal module 34, the synchronous trigger signal controls the laser emitter 12 to emit a laser beam, the synchronous trigger signal simultaneously triggers the counter unit 33 to start counting.

e. The laser receiver 21 receives the laser beam reflected by the measured object. The laser beam through the signal amplifying module 22 generates an end pulse to the gate signal module 34 of the time measuring unit 30. The gate signal module 34 sends the end pulse to the counter unit 33 for terminating the count immediately.

In this process, the start signal provided by the microprocessor 41 is converted into the falling edge of the gate signal after synchronization. The reflected signal received by the receiving unit 20 is converted into the rising edge of the gate signal, forming a negative rectangular gate signal. The signal generated by an external high frequency crystal oscillator 90 is performed for six times frequency multiplication and phase shift by the phase-locked loop module 31 to generate eight high frequency signals as the clock signals of the counter unit 33. The time width of the upper and lower edges of the rectangular gate signal is measured by the eight independent pulse counters, respectively, that is, the time for the laser signal to pass a distance from the laser rangefinder to the measured object. In this embodiment, the frequency of the crystal oscillator 90 is 50 MHz.

f. The integrated count result N of the counter unit 33 composed of the eight pulse counters is transmitted to the microprocessor 41 through the communication module 32.

g. The microprocessor 41 receives the integrated count result N of the counter unit 33, calculates the time value by the microprocessor 41, reads the 3D number axis information of the acceleration sensor 50, and ends the measurement.

The time is calculated by the microprocessor 41: time $t=N*T0/16$, where N is the integrated count result, and T0 is the time period after the external crystal oscillator of 50 MHz is performed for six times frequency multiplication by the phase-locked loop module 31.

The distance between the ranging point and the measured object $D=C*t=C*N*T0/16$, $T0=1/3*10^{-8}$ s, C (the speed of light)$=3*10^8$ m/s, that is, $D=N/16$ (m).

h. the steps c-g are repeated several times until samples obtained reaches statistical samples of 120;

i. The iterative algorithm is used to integrate a number of measurement results and calculate the distance between the ranging point and the measured object.

After the microprocessor 41 sends the trigger signal, the acceleration three-dimensional component data, Ax, Ay, and Az, is read from the acceleration sensor 50. The microprocessor 41 calculates an inclination angle $\theta=\tan^{-1}$ $\sqrt{Ay^2+Az^2}/Ax$ between a line connecting the ranging point and the measured object and a horizontal line.

j. The results are displayed through the display module. There are four display modes.

Mode 1, only displaying the distance between the ranging point and the measured object (unit: meter);

Mode 2, only displaying the distance between the ranging point and the measured object (unit: yard);

Mode 3, displaying the distance between the ranging point and the measured object (unit: meter) and the inclination angle between the line connecting the ranging point and the measured object and the horizontal line (unit: degree);

Mode 4, displaying the distance between the ranging point and the measured object (unit: yard) and the inclination angle between the line connecting the ranging point and the measured object and the horizontal line (unit: degree).

Accordingly, the features of the present invention are described below. The phase-locked loop module 31 has frequency multiplication (frequency multiplication factor being 6) and the phase shift function module 311 to generate multiple clock signals with the same frequency and phase difference of 45° to the respective counters. In the measurement method, the multiplex phase-shift direct counting method is used. That is, the signal generated by the high frequency crystal oscillator 90 is performed for six times frequency multiplication and phase shift by the phase-locked loop module 31 to generate eight high frequency signals as the clock signals of the counter unit 33 (composed of eight counters). The gate signal module 34 converts the transmission time from the laser ranging point to the measured object into a rectangular gate signal, and eight counters directly count the widths of the upper and lower edges of the rectangular gate signal to obtain an integrated count result N. The measurement time t is calculated by the formula in the microprocessor 41. The distance between the ranging point and the measured object is calculated from the measurement time t. When this measurement method is used to measure the distance, only the upper and lower edges of the rectangular gate signal are counted and added with the subsequent processing to take the average, so that the final measurement result can be obtained fast and precisely. In addition, the acceleration sensor 50 can measure the angle between the emitted light beam and the horizontal plane. The iterative algorithm is used to integrate several measurement results to calculate the distance and the inclination angle θ between the ranging point and the measured object, so that the laser rangefinder of the present invention displays not only the measured distance but also the inclination angle. The function is more comprehensive.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method for implementing a laser rangefinder, the laser rangefinder comprising:
   an emitting unit, the emitting unit including an emitting driving module and a laser emitter connected to the emitting driving module;
   a receiving unit, the receiving unit including a laser receiver and a signal amplifying module, the laser receiver being in electrical connection with the signal amplifying module;
   a time measuring unit, the time measuring unit including a phase-locked loop module, a communication module connected to the phase-locked loop module, a counter unit and a gate signal module; an output end of the signal amplifying module being connected to the gate signal module, the gate signal module having one output end connected to the emitting driving module and another output end connected to the counter unit, an output end of the counter unit being connected to the communication module; the counter unit being composed of eight independent pulse counters; the phase-locked loop module comprising a phase shift function module having a frequency multiplication factor of 6 to synchronously generates eight clock signals with a same frequency and phase difference of 45° to the eight independent pulse counters;
   a data processing and control unit, the data processing and control unit including a microprocessor, the microprocessor being connected to an output end of the communication module;
   a display module, connected to the microprocessor;
   a power supply control module, a control end of the power supply control module being connected to the microprocessor, the power supply control module having three output ends connected to the emitting unit, the receiving unit, and the time measuring unit respectively; and
   a button, connected to the microprocessor, an output end of the microprocessor being connected to the gate signal module of the time measuring unit;
   the method for implementing the laser rangefinder comprising the following steps:
   a. aiming the laser rangefinder at an object to be measured, and pressing the button to start a measuring operation;
   b. the microprocessor responding to the pressing of the button in real time to energize, by means of the power supply control module, the emitting unit, the receiving unit and the time measuring unit;
   c. the microprocessor sending a trigger signal, which is in a periodic form, to the time measuring unit;
   d. the time measuring unit receiving the trigger signal and simultaneously sending a synchronous trigger signal through the gate signal module, such that the synchronous trigger signal controls the laser emitter to emit a laser beam, and the synchronous trigger signal simultaneously triggers the counter unit to start counting;
   e. the laser receiver receiving the laser beam reflected by the measured object, the laser beam generating, by means of the signal amplifying module, an end pulse to the gate signal module of the time measuring unit, such that the gate signal module sends the end pulse to the counter unit for terminating the counting immediately;
   wherein in the process, a start signal provided by the microprocessor is converted into a falling edge of a gate signal after synchronization, and a reflected signal received by the receiving unit is converted into a rising edge of the gate signal to form a negative rectangular gate signal, and wherein a signal generated by an external 50 MHz crystal oscillator is subject to phase shifting for six times frequency multiplication by the phase-locked loop module to generate eight high frequency signals as clock signals of the counter unit, such that a width between upper edges of the negative rectangular gate signal is measured by the eight independent pulse counters respectively, to determine a time interval for the laser signal to travel from the laser rangefinder to the measured object and return back to the laser rangefinder;

f. an integrated count result N of the counter unit being transmitted to the microprocessor through the communication module;

g. the microprocessor receiving the integrated count result N of the counter unit, and the microprocessor calculating a time value to end one round of measurement;

wherein the time value is calculated by the microprocessor in such a way that the time value $t=N*T0/16$, where N is the integrated count result, and T0 is a period of a signal that is obtained by subjecting the signal of the external 50 MHz crystal oscillator of 50 MHz to six times frequency multiplication by the phase-locked loop module; and a distance between a ranging point and the measured object $D=C*t=C*N*T0/16$, where $T0=1/3*10^{-8}$ s, C is the speed of light $=3*10^8$ m/s, and $D=N/16(m)$;

h. displaying a result through the display module.

2. The method for implementing the laser rangefinder as claimed in claim 1, wherein in step c, the trigger signal, which is in the periodic form, has a period of 0.5 ms-10 ms.

* * * * *